UNITED STATES PATENT OFFICE.

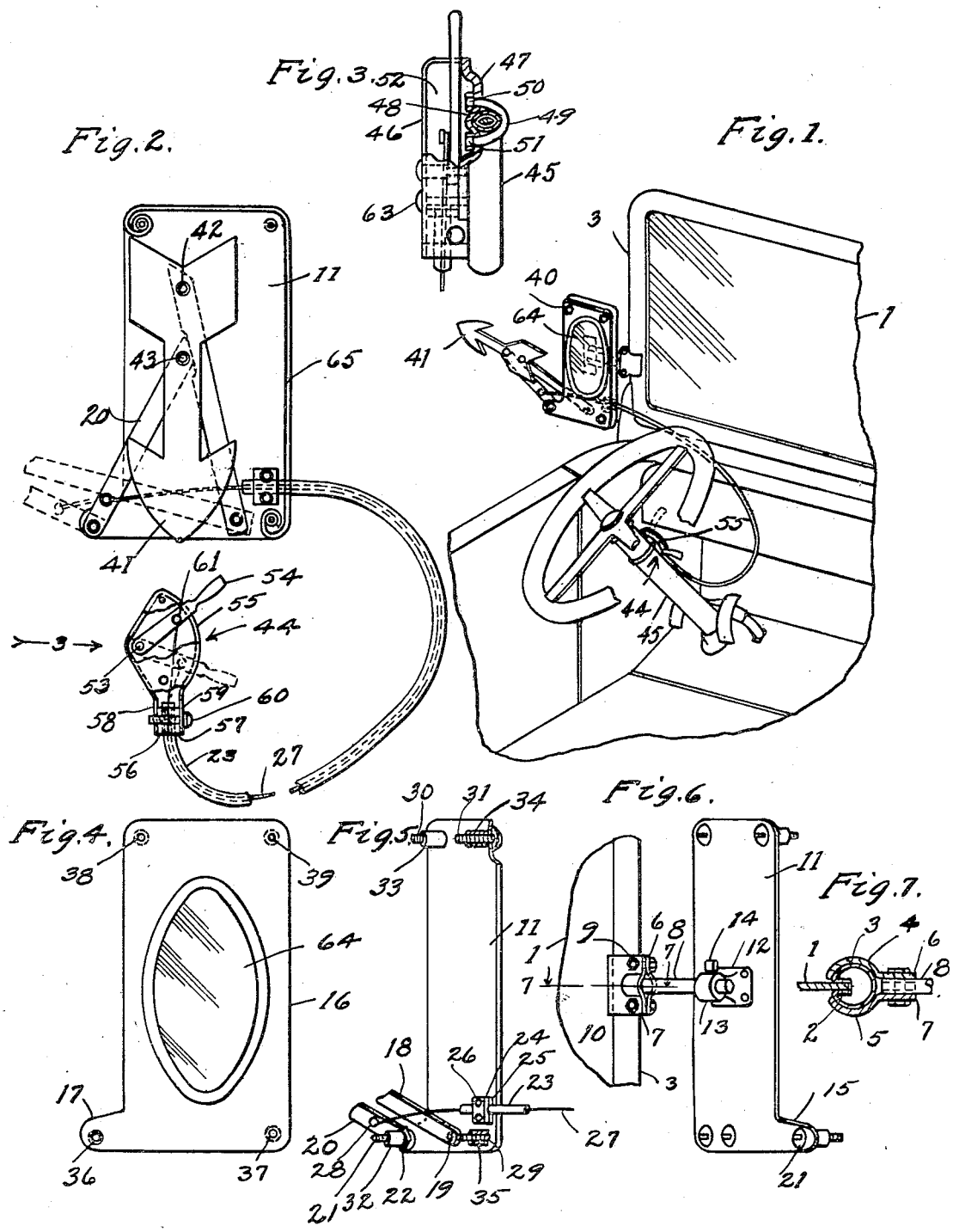

FREDERICK FISCHBECK, OF PASADENA, CALIFORNIA.

DIRECTION-INDICATOR FOR AUTOMOBILES.

1,287,940.

Specification of Letters Patent.

Patented Dec. 17, 1918.

Application filed December 11, 1917. Serial No. 206,683.

*To all whom it may concern:*

Be it known that I, FREDERICK FISCHBECK, a citizen of the United States, residing at Pasadena, in the county of Los Angeles and State of California, have invented new and useful Improvements in Direction-Indicators for Automobiles, of which the following is a specification.

My object is to make an improved direction indicator to be mounted upon the side bar of a wind-shield of an automobile and to be operated from the steering post, and my invention consists in the novel features herein shown, described and claimed.

Figure 1 is a fragmentary perspective showing the steering post and wind-shield of an automobile with a direction indicator embodying the principles of my invention applied thereto.

Fig. 2 is a detail view of the direction indicator removed from the automobile, the rear plate of the semaphore housing, that is, the plate facing the operator, being removed, and parts being broken away in the actuator.

Fig. 3 is a fragmentary perspective showing the actuator attached to the steering post, the view being taken looking in the direction indicated by the arrow 3 in Fig. 2 and on the line 3—3 in Fig. 1.

Fig. 4 is a rear elevation of the rear semaphore housing plate removed from Fig. 2.

Fig. 5 is a fragmentary perspective showing the inside or rear face of the front semaphore housing plate shown in Fig. 2.

Fig. 6 is a fragmentary front elevation of the plate shown in Fig. 5 and showing the means of connecting the semaphore housing to the side bar of the wind-shield.

Fig. 7 is a fragmentary horizontal sectional detail on the line 7—7 of Fig. 6.

The wind-shield glass 1 has its side edge seated in a groove 2 in the side bar 3 of the wind-shield frame. A clamping jaw 4 fits one side of the side bar 3 and a clamping jaw 5 fits the other side. Ears 6 and 7 extend outwardly from the jaws 4 and 5 and the supporting arm 8 is inserted between these ears. Bolts 9 and 10 are inserted through the ears 6 and 7 to clamp the ears rigidly to the supporting bar 8 and to clamp the jaws 4 and 5 to the side bar 3.

The front plate 11 of the semaphore housing has an attaching plate 12 secured in a central position to its front face and a bearing bracket 13 extends forwardly from this plate 12. The supporting arm 8 is slidingly mounted horizontally through the bearing 13 on a line transversely of the automobile and held in position by a set-screw 14, so that by loosening the set-screw 14 the semaphore housing may be moved to or from the wind-shield, the bearing 13 sliding upon the bar 8. The front plate 11 of the semaphore housing is rectangular in elevation, considerably higher than it is wide, and has an arm 15 extending outwardly from its lower outer corner.

The rear plate 16 is substantially the same size and shape as the front plate 11 and has an arm 17 extending outwardly from its outer lower corner to match the arm 15.

The semaphore guide lever 18 is secured to the central portion and near the lower edge of the front plate 11 by a pivot bolt 19. The semaphore actuating lever 20 is secured to the outer end of the arm 15 by a screw 21 inserted through the arm 15 and loosely through the end of the lever 20, and a nut 22 upon the screw against the lever. The push rod guide tube 23 is placed between two clamping plates 24 and 25 and said clamping plates are secured to the plate 11 by bolts 26 so as to rigidly clamp the tube 23 to the plate 11. A push rod 27 slides through the tube 23 and its outer end is connected to the semaphore actuating lever 20 by a bolt 28. Screws 29, 30 and 31 are inserted through the three corners of the plate 11, the screw 21 serving for the other corner. Spacing collars 32, 33, 34 and 35 are placed upon the screws 21, 29, 30 and 31, and the rear plate 16 has openings 36, 37, 38 and 39, and said plate is placed in position with the screws 21, 29, 30 and 31 extending through the openings 36, 37, 38 and 39, and nuts 40 are placed upon the rear ends of the screws to hold the plates 11 and 16 rigidly together in a parallel position to form the semaphore housing.

The pointer 41 is in the form of an arrow and when the pointer is in the housing it stands with its point down, as shown in Fig. 2. The guide lever 18 is connected to the upper end of the pointer 41 by a pivot 42, and the actuating lever 20 is connected to the intermediate portion of the pointer 41 by a pivot 43, the levers 18 and 20 being of such a length and so mounted that when the actuating lever 20 is pulled backwardly by the push rod 27 the pointer 41 will return to its normal position in the housing and when the push rod is operated to throw the actuating lever 20 outwardly the pointer 41 will shoot out of the housing and assume a horizontal position pointing outwardly from the automobile, as shown in Fig. 1.

The actuator 44 is mounted upon the steering post 45. The actuator casing consists of a front plate 46 and a rear plate 47. The rear plate 47 has a vertically extending curved central portion 48 to fit the rounded steering post 45, and a U-clamp 49 is placed against the steering post opposite the portion 48, the ends of the clamp passing through the plate 47, and nuts 50 and 51 are inserted upon the ends of the clamp inside of the plate to clamp the plate rigidly to the steering post. The plates 46 and 47 are dished and meet all around their edges to form a chamber 52. The bolt 53 is inserted through the plates 46 and 47 near their edges, and an actuating hand-lever 54 is pivotally mounted upon this bolt between the plates, there being a slot 55 between the edges of the plates at the opposite side from the pivot 53 so that the hand-lever may be operated up and down from the position shown in full lines to the position shown in dotted lines in Fig. 2.

The push rod guide tube is mounted between clamping jaws 56 and 57, said jaws being mounted between ears 58 and 59 extending from the plate 46, and a screw 60 is inserted through the ears and through the jaws at one side of the tube, so that by manipulating the screw, the end of the tube is rigidly clamped to the actuator casing. The push rod 27 extends through the tube 23 from the bolt 28 to the lever 54 and is secured to said lever by a bolt 61, so that when the lever 54 is raised to the position shown in full lines in Fig. 2 the semaphore pointer 41 is drawn into the housing, and when the lever 54 is depressed to the position shown in dotted lines, the semaphore pointer is moved outwardly to its indicating position as shown in Fig. 1. Bolts 63 connect the plates 46 and 47 together, said bolts being removable so that the plate 46 may be removed to provide access to the works within the actuator casing and to the nuts 50 and 51. The guide tube 23 is preferably a stiff, hard tube and may be of any desired length to pass from the actuator 44 upon the steering post to the dashboard of the automobile and upwardly and outwardly to the semaphore housing, and said tube should be laid without any sharp turns or angles, and the push rod 27 fits closely in the tube and is a hard wire that will slide readily either way through the tube under the impulse of the actuator lever.

A mirror 64 is formed upon the rear face of the rear plate 16 so that the operator can see what is coming behind him. A cover 65 is inserted between the plates 11 and 16 at the top and inner edge.

While I have shown the preferred construction of my direction indicator as now known to me, it will be understood by those skilled in the art that various changes in the combination, construction and arrangement of parts may be made without departing from the spirit of my invention as claimed.

I claim:

In a direction indicator, a clamping jaw adapted to fit one side of the side bar of a wind-shield; a second clamping jaw adapted to fit the other side of said side bar; ears extending outwardly from the jaws; a supporting arm clamped between the ears; a front plate; an attaching plate secured to the front plate in a central position; a bearing bracket extending from the attaching plate, the supporting arm being slidingly mounted through the bearing bracket; a rear plate mounted in spaced relation to the front plate; a guide lever pivotally mounted between the plates; an actuating lever pivotally mounted between the plates; a pointer, the upper end of the guide lever being pivotally connected to the upper end of the pointer and the upper end of the actuating lever being pivotally connected to the intermediate portion of the pointer; and means for operating the actuating lever to swing the pointer out and in.

In testimony whereof I have signed my name to this specification.

FREDERICK FISCHBECK.